(12) United States Patent
Beeson

(10) Patent No.: US 11,717,011 B2
(45) Date of Patent: Aug. 8, 2023

(54) HOT SAUCE

(71) Applicant: Matthew Loren Beeson, Baton Rouge, LA (US)

(72) Inventor: Matthew Loren Beeson, Baton Rouge, LA (US)

(*) Notice: Subject to any disclaimer, the term of this patent is extended or adjusted under 35 U.S.C. 154(b) by 700 days.

(21) Appl. No.: 15/851,063

(22) Filed: Dec. 21, 2017

(65) Prior Publication Data

US 2019/0191750 A1 Jun. 27, 2019

(51) Int. Cl.
| | | |
|---|---|---|
| *A23L 27/60* | (2016.01) | |
| *A23L 27/24* | (2016.01) | |
| *C12G 3/00* | (2019.01) | |
| *A23L 27/10* | (2016.01) | |
| *A23L 23/00* | (2016.01) | |
| *A23L 33/105* | (2016.01) | |

(52) U.S. Cl.
CPC .............. *A23L 27/60* (2016.08); *A23L 23/00* (2016.08); *A23L 27/10* (2016.08); *A23L 27/24* (2016.08); *A23L 33/105* (2016.08); *C12G 3/00* (2013.01); *A23V 2002/00* (2013.01); *A23V 2250/082* (2013.01); *A23V 2250/30* (2013.01)

(58) Field of Classification Search
CPC .......... A23L 27/20; A23L 27/24; A23L 27/60; A23V 2002/00; A23V 2250/082; A23V 2250/32
USPC ................................................ 426/589, 638
See application file for complete search history.

(56) References Cited

U.S. PATENT DOCUMENTS

| | | |
|---|---|---|
| 5,660,830 A | 8/1997 | Anderson |
| 2010/0166895 A1 | 7/2010 | Louro |

OTHER PUBLICATIONS

"Peppers Safe Methods to Store, Preserve and Enjoy" by Harris of UC Davis—obtained from https://web.archive.org/web/20040421110317/http://ucce.ucdavis.edu:80/files/datastore/234-12.pdf (Year: 2004).*
Manuel Mega's Malt Whiskey hot sauce recipe obtained from the hotsauceaddiction.com (Year: 2013).*
Tequila hot sauce recipe by minitindel ( 3 pages, dated 2008), 3 pages (Year: 2008).*
Simple pepper sauce recipe as part of "Get creative with hot sauce—make your own Hot Pepper Mash" (5 pages, dated 2014) Sourced from http://tropicsgourmet.com/hot-pepper-mash/. (Year: 2014).*
Making Hot Sauce 101 Started by salsalady, Mar. 31, 2012 obtained from the hot pepper (Year: 2012).*
Evidentiary reference https://www.mathsisfun.com/measure/measuring-cups.html—Apr. 2014 (Year: 2014).*
Pepper Mash and chilli sauce, Sep. 2012 (Year: 2012).*
Homemade Boozy hot sauce (Published Dec. 10, 20150 in recipe box from the Oregonian|Oregonlive (Year: 2015).*
Ten of world's Strongest spirits dated Jul. 29, 2014 from spirits business, hereinafter Sprits business, 1 page (Year: 2014).*
"UV Sriracha Vodka is the Hottest New Flavor by Phillips Distilling Company" Press relaese from the Growler dated Dec. 2, 2013, 6 pages (Year: 2013).*
Alcohol content in wine and other drinks (infographic)—wine folly–2013 (Year: 2013).*
NPL Water content of Vodka "what's inside: Vodka" by Patrick obtained from www.wired.com/2013/03/whats-inside-vodka/—3 pages (Year: 2013).*
Rating Chili Peppers on a Scale of 1 to Oh Dear God I'm on Fire by Anna Maria Barry-Jester, date: Oct. 15, 2014; Oct. 15, 2014, 7 pages (Year: 2014).*
Tequila Hot Sauce, Recipe from Bonnier Corporation, Dec. 11, 2010 (Year: 2010).*
Whiskey Hot Sauce Mar. 2, 2011 | Ivoryhut—8 pages (Year: 2011).*
Definition of suspension and Mixture, obtained from Merriam Webster Collegiate Dictionary—tenth Edition—copyright year 2001, pp. 748 and 1142. (Year: 2001).*
Definition of Suspension: http://www.chemicool.com/definition/suspension.html—date Jun. 7, 2013; 2 pages; Date verified by web archive.org (Year: 2013).*
Chemical Mixtures; obtained from https://www.ducksters.com/science/chemistry/chemical_mixtures.php; date May 7, 2013—4 pages; ate verified by web archive.org. (Year: 2013).*
http://www.chemicool.com/definition/suspension.html.*
Preserving Fruit in Alcohol, http://www.instructables.com/id/Preserving-Fruit-in-Alcohol/, Retrieved Oct. 23, 2017.
Maccharles, Joel, Jul. 6, 2010, Infusing Vodka with Hot Peppers, http://www.wellpreserved.ca/infusing-vodka-with-hot-peppers-preserving-summer/.

* cited by examiner

*Primary Examiner* — Jyoti Chawla
(74) *Attorney, Agent, or Firm* — Edel Patents LLC; John B. Edel

(57) ABSTRACT

Hot sauces are disclosed that contain capsaicin, ethyl alcohol and solids. The hot sauces may be in the form of a suspension and may be at least 1,000 SHU on the Scoville scale. The suspension may also be between 16 and 65% alcohol by volume.

10 Claims, No Drawings

HOT SAUCE

Hot sauces described herein may be used in food preparation and with food or beverage items being consumed. Certain hot sauces disclosed herein contain pepper mash and alcohol. Hot sauces described herein may further be useful as a condiment.

DETAILED DESCRIPTION

Example 1

Examples of hot sauce may be prepared using an aged pepper base, which may take the form of natural fermented capsicum peppers, an alcoholic liquid, and a thickening agent. Alcoholic liquids that may be used include rum vodka, whiskey, tequila and other distilled spirits. In certain examples, the seeds and skin are removed from the pepper mash in a solids removal step after which the remaining fermented pepper liquids along with any remaining small solids are blended. As an example, blending may be done with an immersion blender. Xanthan gum and an alcoholic liquid may be mixed into the blended peppers to achieve the hot sauce or pepper sauce. The result of the blending may be a suspension wherein the suspended solids are the majority of solids in the hot sauce. Table 1 below shows a series of potential examples in which the above-described ingredients may be combined to make hot sauce. A very large number of additional examples may be prepared consistent with the disclosures of this example. Further, xanthan gum may either be omitted from the formula or another thickening or viscosity enhancing food additive may be added to the formula either as a substitute for the xanthan gum or in addition to the xanthan gum.

Example 2

A wide variety of Capsicum peppers may be used either individually or as mixtures of peppers to make the pepper mash for inclusion in the embodiments described herein. Selections of different pepper mashes from different peppers may also be blended for use in the hot sauce formula. Example peppers which may be used with the present invention include habanero chili, Scotch bonnet pepper, datil pepper, rocoto, Madame Jeanette, fatalii, malagueta pepper, chiltepin pepper, siling labuyo, guntur chilli, cayenne pepper, ají pepper, tabasco pepper, capsicum chinense, serrano pepper, Peter pepper, chile de árbol, Aleppo pepper, cheongyang chili pepper, peperoncino, guajillo pepper, Wiri wiri, Thai, Aji, Fresno chili pepper, Trinidad Moruga Scorpion, Bahamian Bird, jalapeño, Cheyenne, piri piri, Amazon, Hatch Chilli, Bhut Jolokia, pequin pepper, and bird's eye chili. Examples of pepper mixtures may include mixtures from Table 2 below:

TABLE 2

| Combination | Peppers |
| --- | --- |
| 1 | Habanero, Serrano |
| 2 | Jalapeño, Aleppo |
| 3 | Cayenne, Tabasco |
| 4 | Habanero, Anaheim |
| 5 | Serrano, Bird's eye chili |
| 6 | Jalapeño, Anaheim |
| 7 | Tabasco, Scotch bonnet |
| 8 | Trinidad Moruga Scorpion, Habanero, Bahamian Bird |
| 9 | Wiri wiri, Thai, Aji |
| 10 | Tabasco, Cheyenne, Serrano |
| 11 | Scotch Bonnet, Habanero, Cayenne |
| 12 | Amazon, Hatch Chilli, Bhut Jolokia |

TABLE 1

| Formula | Alcohol ingredient | Alcohol ingredient's ethanol percent (mL/mL) | Alcohol ingredient % in final mixture (mL/mL) | Pepper mash % in final mixture (mL/mL) | Xanthan gum % in final mixture (mL/mL) | % Alcohol in final mixture (mL/mL) |
| --- | --- | --- | --- | --- | --- | --- |
| 1 | Rum | 40.0% | 40.0% | 59.9% | 0.1% | 16.0% |
| 2 | Bourbon | 40.0% | 40.0% | 59.9% | 0.1% | 16.0% |
| 3 | Tequila | 40.0% | 40.0% | 59.9% | 0.1% | 16.0% |
| 4 | Vodka | 40.0% | 40.0% | 59.9% | 0.1% | 16.0% |
| 5 | Rum | 60.0% | 27.0% | 72.9% | 0.1% | 16.2% |
| 6 | Bourbon | 60.0% | 27.0% | 72.9% | 0.1% | 16.2% |
| 7 | Tequila | 60.0% | 27.0% | 72.9% | 0.1% | 16.2% |
| 8 | Vodka | 60.0% | 27.0% | 72.9% | 0.1% | 16.2% |
| 9 | Rum | 60.0% | 33.0% | 66.9% | 0.1% | 19.8% |
| 10 | Bourbon | 60.0% | 33.0% | 66.9% | 0.1% | 19.8% |
| 11 | Tequila | 60.0% | 33.0% | 66.9% | 0.1% | 19.8% |
| 12 | Vodka | 60.0% | 33.0% | 66.9% | 0.1% | 19.8% |
| 13 | Rum | 40.0% | 49.9% | 50.0% | 0.1% | 20.0% |
| 14 | Bourbon | 40.0% | 49.9% | 50.0% | 0.1% | 20.0% |
| 15 | Tequila | 40.0% | 49.9% | 50.0% | 0.1% | 20.0% |
| 16 | Vodka | 40.0% | 49.9% | 50.0% | 0.1% | 20.0% |
| 17 | Rum | 40.0% | 75.0% | 24.9% | 0.1% | 30.0% |
| 18 | Bourbon | 40.0% | 75.0% | 24.9% | 0.1% | 30.0% |
| 19 | Tequila | 40.0% | 75.0% | 24.9% | 0.1% | 30.0% |
| 20 | Vodka | 40.0% | 75.0% | 24.9% | 0.1% | 30.0% |
| 21 | Rum | 60.0% | 50.0% | 49.9% | 0.1% | 30.0% |
| 22 | Bourbon | 60.0% | 50.0% | 49.9% | 0.1% | 30.0% |
| 23 | Tequila | 60.0% | 50.0% | 49.9% | 0.1% | 30.0% |
| 24 | Vodka | 60.0% | 50.0% | 49.9% | 0.1% | 30.0% |
| 25 | Rum | 60.0% | 83.4% | 16.5% | 0.1% | 50.0% |
| 26 | Bourbon | 60.0% | 83.4% | 16.5% | 0.1% | 50.0% |
| 27 | Tequila | 60.0% | 83.4% | 16.5% | 0.1% | 50.0% |
| 28 | Vodka | 60.0% | 83.4% | 16.5% | 0.1% | 50.0% |

Many other blends and individual peppers from the capsicum family may be used in the combination including peppers not listed.

The blend of peppers is the dominant factor in the ultimate heat of the hot sauce produced. Embodiments described herein may be at least 400 Scoville heat units (SHU) on the Scoville scale. Certain embodiments described herein may be at least 1,000 SHU on the Scoville scale. Further, among those embodiments many may be between 1,500 and 10,000 SHU on the Scoville scale.

Example 3

Many of the hot sauces described herein may be differentiated from simple alcohol-based capsaicin extractions based on the presence of small amounts of solids in the hot sauces. The solids along with the presence of organic compounds that originate from the peppers from which the hot sauce is made may provide significant differentiation from alcohol-based capsaicin extractions by providing a flavor profile associated with the peppers from which the hot sauce is derived. Various analytical techniques may be used to show the presence of components from the original peppers in the hot sauce and those techniques may even be used to differentiate capsicum pepper varieties used in the hot sauce. The amount of solids that carry over into the hot sauce from the peppers may be evaluated by a loss on drying test which evaluates the weight percentage of hot sauce that is evolved by drying a sample at 100° C. until the sample achieves a constant weight. The mass percent of the sample that is lost to the drying process during the loss on drying test is described as the percent moisture. As that phrase is used herein "percent moisture" indicates the result of the loss on drying test and is used as a mass percent unless otherwise indicated. Because alcohol evolves from test samples at least as readily as water, it is understood that percent moisture numbers used herein correlate to the total amount of alcohol and water in a sample.

Certain embodiments described herein have a percent moisture between 65% (mg/mg) and 98% (mg/mg). Many of those embodiments have a percent moisture between 75% (mg/mg) and 97% (mg/mg). In one embodiment, the pepper sauce has a percent moisture of 87.3% (mg/mg).

Example 4

Hot sauces and pepper sauces described herein may have superior shelf stability as compared to acid or vinegar stabilized hot sauces and pepper sauces. A hot sauce according to the present disclosure was subjected to light based accelerated shelf life testing along with a commercially available vinegar based hot sauce. Testing indicated virtually no change in the coloration of the alcohol containing hot sauce and significant shift in color toward brown for the vinegar based hot sauce. The testing indicated superior shelf stability and maintenance of original color for hot sauces prepared according to the present disclosure including the product having no signs of spoilage, separation or degredation after a simulated three year shelf life.

Example 5

Hot sauces described herein may have pH values that are higher than acid preserved hot sauces. The pH of the hot sauces described herein may, for example, be greater than 3 with certain such hot sauces having a pH greater than 3.3 and many such hot sauces having a pH greater than 3.6. Certain hot sauces prepared as described herein were tested for pH. Measured pH values for those hot sauces included 3.84, 3.91 and 4.14. Certain hot sauces consistent with the present disclosure may have a pH between 3.3 and 5.5.

Example 6

Organoleptic tests were conducted on one of the embodiments described in Example 1 and the product was unanimously found to be unfit for beverage purposes by a seven-person taste panel. The result of the organoleptic tests may be predominantly attributable to the level of capsaicin in the hot sauce.

The ratio of capsaicin to alcohol may be important to the performance of the hot sauce formulations and may be characterized by the following Scoville alcohol ratio.

$$\text{Scoville alcohol ratio} = \frac{\text{Hot sauce Scoville heat units } (SHU)}{\text{Hot sauce alcohol volume fraction}}$$

Any use of the phrase "Scoville alcohol ratio" herein refers to the above formula. By way of example, a hot sauce measuring 2000 SHU on the Scoville scale and that was 25% alcohol by volume would have a Scoville alcohol ratio of 8,000. Scoville alcohol ratios consistent with the present disclosure may allow hot sauces to function and perform as hot sauces while reducing the risk of such hot sauces being consumed as an intoxicant.

Hot sauces described herein may have a Scoville alcohol ratio exceeding 1500 SHU. Hot sauces described herein may have a Scoville alcohol ratio between 2000 and 65,000 SHU. In related embodiments, the Scoville alcohol ratio may be at least 2,000 SHU. In related embodiments, the Scoville alcohol ratio may be between 5,000 and 50,000 SHU. In further related embodiments, the Scoville alcohol ratio may be between 7,500 and 30,000 SHU. In still further related embodiments, the Scoville alcohol ratio may be between 10,000 and 20,000 SHU.

Further Examples

Hot sauces described herein may, for example, comprise capsaicin; ethyl alcohol and solids such that the capsaicin, the ethyl alcohol and the solids are in the form of a suspension; a percent moisture of the suspension is between 65% (mg/mg) and 98% (mg/mg); the pH of the suspension is greater than 3.0; the suspension measures at least 1,000 SHU on the Scoville scale and the suspension is between 16 and 65% alcohol by volume. In a related example, the suspension may be between 18 and 40% alcohol by volume. In a related example, the percent moisture of the suspension may be between 75% (mg/mg) and 97% (mg/mg). In a related example, the hot sauce may include a bottle and a nutritional facts label such that the suspension is located in the bottle. In a related example, the hot sauce may contain rum. In a related example, the hot sauce may contain whiskey. In a related example, the hot sauce may contain tequila. In a related example, the hot sauce may contain vodka. In a related example, the hot sauce may contain a distilled alcoholic beverage. In a related example, the hot sauce may contain a fermented pepper mash. In a related example, the hot sauce may exclude any food grade acids as ingredients. In a related example, the hot sauce may exclude vinegar as an ingredient. In a further related example, the suspension may have between a 5,000 and a 50,000 SHU Scoville alcohol ratio. In a further related example, the suspension may have between a 7,500 and a 30,000 SHU Scoville alcohol ratio. In a further related example, the suspension may measure between 1,000 and 100,000 SHU on the Scoville scale. In a further related example, the pH of the suspension may be greater than 3.3. In a further related example, the pH of the suspension may be greater than 3.6. In a further related example, the pH of the suspension may be between 3.3 and 5.5.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

The invention claimed is:

1. A hot sauce comprising:
   a. capsaicin sourced from capsicum pepper liquids and solids;
   b. ethyl alcohol;
   c. solids;
   d. wherein the hot sauce is a shelf stable suspension having a pH greater than 3.0;
   e. wherein a percent moisture of the hot sauce is between 65% and 98% by weight;
   f. wherein the hot sauce measures at least 1,000 SHU on the Scoville scale;
   g. wherein the hot sauce is between 16 and 65% alcohol by volume;
   h. wherein the hot sauce is organoleptically unfit for beverage purposes; and
   i. wherein the hot sauce does not contain vinegar and has a color stability superior to vinegar preserved hot sauce.

2. The hot sauce of claim 1 wherein the hot sauce is between 18 and 40% alcohol by volume.

3. The hot sauce of claim 1 wherein the percent moisture of the suspension hot sauce is between 75% and 97% by weight.

4. The hot sauce of claim 1 further comprising a distilled alcoholic beverage.

5. The hot sauce of claim 1 further comprising fermented pepper mash.

6. The hot sauce of claim 1 wherein the hot sauce does not contain a food grade acid.

7. The hot sauce of claim 1 wherein the hot sauce has at least a 2,000 SHU Scoville alcohol ratio.

8. The hot sauce of claim 1 wherein the hot sauce has between a 7,500 and a 30,000 SHU Scoville alcohol ratio.

9. The hot sauce of claim 1 wherein the pH of the hot sauce is between 3.3 and 5.5.

10. The hot sauce of claim 1 further comprising a distilled alcoholic beverage and fermented pepper mash wherein:
    a. the hot sauce is between 18 and 40% alcohol by volume;
    b. the percent moisture of the hot sauce is between 75% and 97% by weight;
    c. the hot sauce has between a 7,500 and a 30,000 SHU Scoville alcohol ratio;
    d. the hot sauce measures between 1,000 and 100,000 SHU on the Scoville scale and
    e. the pH of the hot sauce is between 3.3 and 5.5.

* * * * *